United States Patent
Casale et al.

(10) Patent No.: US 9,852,398 B1
(45) Date of Patent: Dec. 26, 2017

(54) SYSTEMS AND METHODS FOR MANAGING DATA IN REMOTE HUDDLE SESSIONS

(71) Applicant: MASSACHUSETTS MUTUAL LIFE INSURANCE COMPANY, Springfield, MA (US)

(72) Inventors: Robert Casale, Bristol, CT (US); Abigail O'Malley, Brighton, MA (US); Kedzie Teller, Brookline, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 267 days.

(21) Appl. No.: 14/733,215

(22) Filed: Jun. 8, 2015

Related U.S. Application Data (60) Provisional application No. 62/008,896, filed on Jun. 6, 2014, provisional application No. 62/008,888, filed on Jun. 6, 2014, provisional application No. 62/008,916, filed on Jun. 6, 2014, provisional application No. 62/008,937, filed on Jun. 6, 2014, provisional application No. 62/008,948, filed on Jun. 6, 2014.

(51) Int. Cl.
G06F 17/30 (2006.01)
G06Q 10/10 (2012.01)
H04L 29/08 (2006.01)

(52) U.S. Cl.
CPC ..... G06Q 10/103 (2013.01); G06F 17/30424 (2013.01); H04L 67/10 (2013.01)

(58) Field of Classification Search
CPC ......... G06F 17/30424; G06F 17/30203; G06F 17/30; G06F 17/00
USPC .................................................. 707/600–899
See application file for complete search history.

(56) References Cited

U.S. PATENT DOCUMENTS

| | | | |
|---|---|---|---|
| 7,062,511 B1 | 6/2006 | Poulsen | |
| 7,802,207 B2 | 9/2010 | Agboatwalla et al. | |
| 7,827,494 B1 | 11/2010 | Hedayatpour et al. | |
| 8,072,439 B2 | 12/2011 | Hillis et al. | |
| 8,181,115 B2 | 5/2012 | Irving | |
| 9,594,823 B2 * | 3/2017 | Chaney | G06F 17/30595 |
| 2003/0046401 A1 | 3/2003 | Abbott et al. | |
| 2007/0240063 A1 | 10/2007 | Cheng et al. | |
| 2009/0119280 A1 | 5/2009 | Waters et al. | |
| 2009/0204906 A1 | 8/2009 | Irving | |
| 2010/0070881 A1 | 3/2010 | Hanson et al. | |
| 2010/0192072 A1 | 7/2010 | Spataro et al. | |
| 2011/0022991 A1 | 1/2011 | Hillis et al. | |

(Continued)

Primary Examiner — Isaac M Woo
(74) Attorney, Agent, or Firm — Eric L. Sophir; Dentons US LLP (57) ABSTRACT

Systems and methods for managing data in remote huddle collaboration are disclosed. The system for managing data may include one or more software modules which may employ one or more methods for uploading, downloading, and distributing data required in remote huddle sessions. Such method may allow storage of data in databases for a subsequent access when requested. Data may be indexed and may use tags and meta-tags for a fast search and storage. Method for managing data may allow users to set permissions for the data access in order to organize duties and set confidentiality during remote huddle collaboration. In addition, the system for managing data may employ a method for searching data available for other huddles, this method may use one or more search engines employing data mining.

3 Claims, 6 Drawing Sheets

(56) References Cited

U.S. PATENT DOCUMENTS

| | | |
|---|---|---|
| 2011/0113348 A1 | 5/2011 | Twiss et al. |
| 2012/0110087 A1 | 5/2012 | Culver et al. |
| 2012/0124484 A1 | 5/2012 | Robinson et al. |
| 2012/0159359 A1 | 6/2012 | Ehrler et al. |
| 2013/0091440 A1 | 4/2013 | Kotler et al. |
| 2013/0218978 A1 | 8/2013 | Weinstein et al. |
| 2013/0254658 A1 | 9/2013 | Nestler et al. |
| 2014/0082525 A1 | 3/2014 | Kass et al. |
| 2014/0172485 A1 | 6/2014 | Thean |
| 2014/0189818 A1 | 7/2014 | Meyer |
| 2014/0282106 A1 | 9/2014 | Smith et al. |
| 2014/0282135 A1 | 9/2014 | Segre |
| 2014/0337778 A1 | 11/2014 | Armitage |
| 2015/0067058 A1 | 3/2015 | Vellozo Luz et al. |
| 2015/0120577 A1 | 4/2015 | Lobo et al. |
| 2015/0149929 A1 | 5/2015 | Shepherd et al. |
| 2015/0229533 A1 | 8/2015 | Vida et al. |
| 2016/0100019 A1 | 4/2016 | Leondires |

\* cited by examiner

SYSTEMS AND METHODS FOR MANAGING DATA IN REMOTE HUDDLE SESSIONS

CROSS-REFERENCE TO RELATED APPLICATIONS

This application claims priority to U.S. Provisional Patent Application Ser. No. 62/008,896, filed Jun. 6, 2014, U.S. Provisional Patent Application Ser. No. 62/008,888, filed Jun. 6, 2014, U.S. Provisional Patent Application Ser. No. 62/008,916, filed Jun. 6, 2014, U.S. Provisional Patent Application Ser. No. 62/008,937, filed Jun. 6, 2014, and U.S. Provisional Patent Application Ser. No. 62/008,948, filed Jun. 6, 2014, all of which are hereby incorporated by reference in their entirety.

TECHNICAL FIELD

The present disclosure relates in general to collaboration systems, and more specifically to systems and methods for remote huddle collaboration.

BACKGROUND

Conventionally, team members working on one or more projects within a company may get together in a huddle on a daily basis to share information, discuss topics, evaluate performance, identify issues, and/or solve problems collaboratively. Since the introduction of the huddle, whiteboards have acted as the traditional huddle tool for storing all information collected during huddle time. However, one drawback of the current huddle methodology is that data related to the huddle is not easy to upload, download, and distribute. In addition, searching for data available in other huddles may be difficult and not effective.

Alternatives to overcome the challenge of gathering team members who may be at different locations for huddle, may include the use of one or more collaboration tools such as conference phone calls, video conferences, internet relay chat (IRC), and instant messaging, among others. These collaboration tools may enable data attachment and links sharing. However, uploading data directly to a specific user may reduce bandwidth and may produce a huddle without a correct data access structure. Since only a few members may possess the data and the others may do not know about such data, huddle may be ineffective and goals achievement procedure may be not organized.

Conventional approaches to meetings amongst remote users fail address all of the deficiencies of the conventional collaboration tools. A web meeting may allow a user to share a computer desktop with another user in a remote location. But the user must select which application should be presented on the computer desktop, so there is no ability to present a page that has information from multiple sub-applications that are dynamically updated. Further, the user cannot include annotations overlaid on the page that are simultaneously presented to the remote user and also stored with that particular page such that the particular page can be retrieved at a later date along with those annotations.

Moreover, conventional extranets are capable of sharing information from a common source, but these extranets do not offer real-time collaboration through real-time updates and simultaneous displays to other users. Further, these conventional extranets do not utilize sub-applications that dynamically display data associated with users simultaneously accessing the extranet. Conventional computer solutions do not offer the desired collaboration, real-time updating, dynamic presentation of data, and linking of additional content to the displayed data.

For the aforementioned reasons, there is a need for systems and methods which may enable data managing in huddle collaboration between team members of a given project in order to overcome these and other drawbacks of current methodologies for huddles.

SUMMARY

The systems and methods described herein address the deficiencies described above, and may offer other benefits as well. The present disclosure describes systems and methods for managing data in remote huddle collaboration. The system may enable participants to fully engage in huddles regardless of their location. The system may collect and store information during huddle time, replacing traditional whiteboards, where this information may be available to the users in the form of one or more sub-applications.

In some embodiments, a computer-implemented method comprises receiving, by a computer, a selection of a huddle record from a user device, the huddle record stored in a database storing one or more huddle records comprising data describing a huddle board display page and user access rights to the data of the huddle record; upon authenticating the user device based upon the user access rights and a set of user credentials: receiving, by the computer, a new data from the user device through a network connection coupling the computer with the user device; receiving, by the computer, from the user device a plurality of selections indicating one or more characteristics of the new data; generating, by the computer, a plurality of tags for the new data based upon the selection of the huddle record and the plurality of selections received from the user device, wherein a first tag is metadata that associates the new data with the huddle record, and wherein each respective tag of the plurality of tags is metadata indicating a respective characteristic of the new data; storing, by the computer, the new data in the database, wherein the new data is associated with one or more huddle records in accordance with one or more tags associating the new data with the one or more huddle records; upon the computer receiving, from the user device, a query for data related to a huddle board, wherein the query contains one or more parameters identifying data related to the huddle board including a keyword and one or more characteristics: identifying, by the computer, in a second database a machine-readable computer file containing data matching the keyword parameter of the query; identifying, by the computer, in the second database a machine-readable computer file having a metadata tag indicating the computer file matches the one or more characteristics; identifying, by the computer, each huddle record containing data associated with the tag indicating the data has a characteristic matching the keyword parameter of the query; identifying, by the computer, each based upon the first tag the data in the record of the huddle board in the database of huddle records; and serving, by the computer, to the user device, a composite huddle board display page with a set of query results based on the one or more parameters of the query, the set of query results displaying the one or more huddle records having data related to the huddle board and the one or more machine-readable computer files having data related to the huddle board.

Systems and methods for data managing in remote huddle collaboration may enable each project team member to remotely access data related to the huddle. Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used herein, the following terms have the following definitions:

"Huddle" refers to a group of two or more members of a team, brought together on a regular basis to recognize outstanding contributions, evaluate performance, identify issues, and solve problems collaboratively.

"Huddle board" refers to a user interface generated by a huddle collaboration system which may display the content collected during a huddle in the form of one or more sub-applications.

"User's Huddle Boards" refers to a user interface generated by a huddle collaboration system which may display a list of huddle boards in which the user may be participating in, and a list of public boards which may be viewed by anyone in the company.

"Active Huddle" refers to a huddle board which a leader may have started and to which one or more participants may join remotely through a huddle collaboration system.

"Team Member" refers to a user that may participate in a remote huddle collaboration by means of a computing device. The user may be part of the team performing tasks of a particular project.

"Leader" refers to a team member that may initiate and manage a huddle session. A leader may have an additional set of permissions that may include for example, the ability to create huddle boards, configure or otherwise modify a huddle session, among others.

"Sub-application" refers to a software tool that may enable remote collaboration between authenticated team members in a digital huddle environment.

"Huddle summary" refers to a user interface generated by a huddle collaboration system which may show one or more sub-applications in the huddle board, and each sub-application may display a summary-level view of the data it may contain.

In some embodiments, a computer-implemented huddle collaboration system may include different components which may dynamically interact with each other through network connections. Huddle collaboration system may include one or more internal databases operatively coupled to a huddle management system, among other components. Huddle management system may include one or more authentication modules, one or more data processing modules, one or more module managers, among other software modules. Huddle collaboration system may also include any suitable user interface through which users, such as huddle leaders and huddle participants, may interact with huddle management system by means of a computing device. Computing device may be any computer type device that may receive, process, and/or transmit digital data including a bus which may enable the communication between components such as input/output devices, an interface, a memory, a storage device and a central processing unit (CPU), among others.

According to another embodiment, a computer-implemented method for managing data in remote huddle collaboration may include the actions of uploading and downloading data to an internal database. The process of uploading data may include indexing data according to the huddle where the data may be used. In addition, data uploading and indexing may be performed by a data processing module, which may use tags, meta-tags and other suitable methods for indexing data according to the huddle. Furthermore, uploading may be performed during active and non-active huddle sessions. Data uploaded may include text, images, sound, videos, and the like. Huddle sessions may be recorded in video and/or audio, where such video and/or audio files may be automatically stored in an internal database by the data processing module.

According to another embodiment, during data uploading, the team leader may establish rules and permissions for accessing the data stored in the internal databases. Such permissions may be configured according to the specific profiles of the users invited to a Huddle.

Furthermore, in order to access data from an internal database, the data processing module may include a method for requesting data download from the internal database. Data processing module may restrict data download according to the permissions set by the leader. Such permissions may allow data download for some specific users in the huddle. In addition, data may be downloaded to a user computing device and/or may be viewed online.

In yet another embodiment, data processing module may execute one or more search engines, which may execute search for data stored in the internal databases. Search engine may include data mining for providing search suggestions and may use indexing, tags and meta-tags for finding required data in any internal database.

Figure 1:
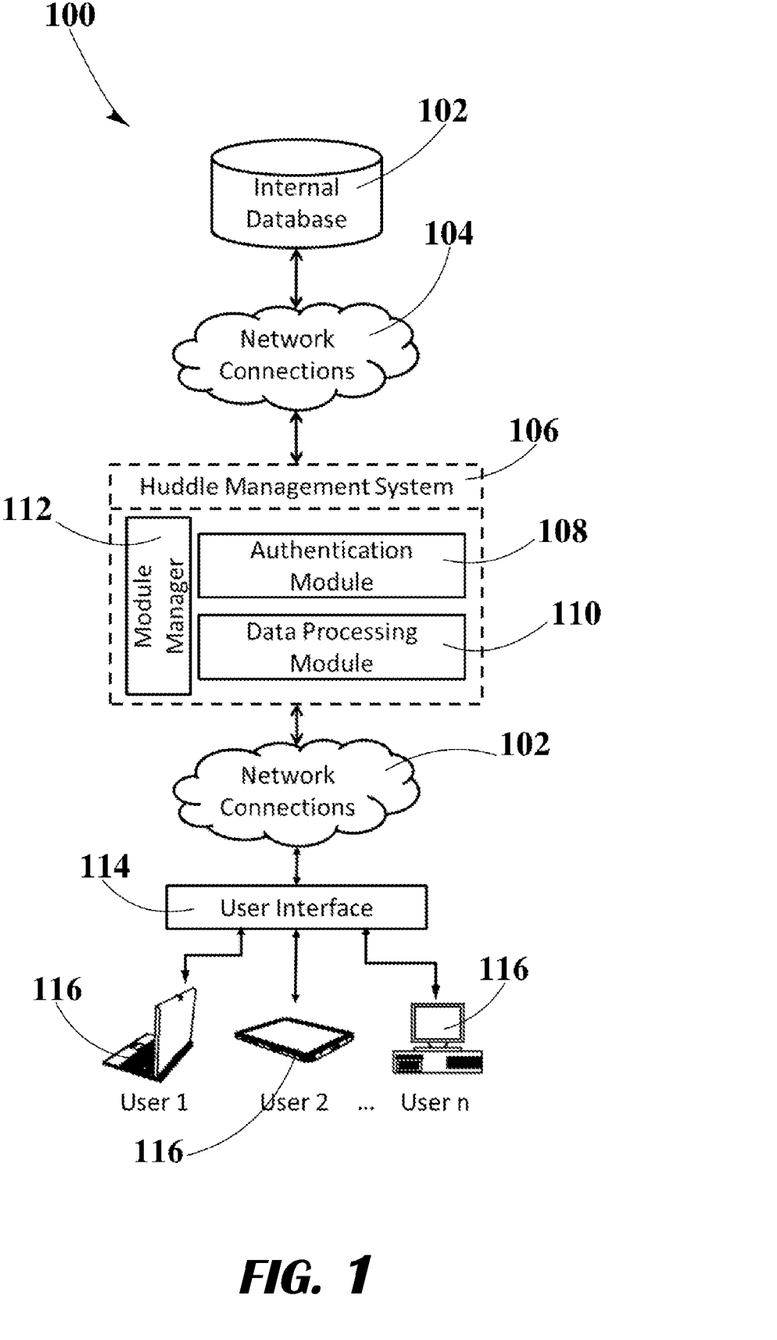
FIG. 1 is a system architecture of a remote huddle collaboration system, according to an embodiment.

FIG. 1 shows a system architecture 100 for a remote huddle collaboration system, according to an embodiment. The disclosed system architecture 100 may include different components which may dynamically interact with each other through network connections 102. Network connections 102 may refer to any suitable connection between computers, such as for example intranets, local area networks (LAN), virtual private networks (VPN), wireless area networks (WAN), and the internet, among others.

System architecture 100 may include one or more internal databases 104 and a huddle management system 106, among other components. Internal database 104 may store data generated by one or more software modules operating within huddle management system 106, data and files uploaded by a user such as a huddle leader or a huddle participant, and the credential of each authorized user of the company to allow each authorized user to access and modify huddle boards, among others. Internal database 104 may grant access to huddle management system 106 when needed, and may be implemented through known in the art database management systems (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data.

Huddle management system 106 may be operatively coupled to internal database 104 through network connections 102, and may include one or more authentication modules 108, one or more data processing modules 110, one or more module managers 112, and any other suitable software module required for the proper operation of huddle management system 106. Each software module within huddle management system 106 may include a processing unit for running related algorithms or computer executable program instructions that may be executed by a server, a single computer, or multiple computers in a distributed configuration; and may be configured to interact with one or more software modules of the same or different type operating within huddle management system 106. Each processing unit may include a processor with computer-readable medium, such as a random access memory (RAM) coupled to the processor. Examples of a processor may include a microprocessor, an application specific integrated circuit (ASIC), and a field programmable object array (FPOA), among others.

Huddle management system 106 may generate a suitable user interface 114 on a client computing device 116 through which a user, such as a huddle leader and/or a huddle participant, may interact with one or more software modules operating within huddle management system 106. Client computing device 116 may be any computer type device such as smartphones, desktop computers, laptop computers, tablets, PDAs, and/or another type of processor-controlled device that may receive, process, and/or transmit digital data. In addition, user interface 114 may be configured to collect information from one or more internal databases 104, and receive and/or feed information to one or more users interacting with client computing device 116.

According to some embodiments of the present disclosure, huddle management system 106 may generate user interface 114 which may request and/or collect information from one or more client computing devices 116 through which users may interact with user interface 114 via an input device, such as a touch screen, a mouse, a keyboard, a keypad, and others. Authentication module 108 may receive the user's credentials through client computing device 116 and may validate those credentials in order to assign permission to access, start, edit, and/or manage one or more huddle boards and/or sub-applications in the huddle board. Data processing module 110 may receive and process information collected during an active huddle session, and may store this information in internal database 104 when needed. Data processing module 110 may also be configured to automatically retrieve information requested by one or more client computing devices 116 and/or one or more software modules, where this information may be obtained from internal database 104 and/or the suitable operation of one or more software modules within huddle management system 106. Module manager 112 may interact with one or more software modules operating within huddle management system 106, in addition to controlling the operation of huddle collaboration system and processing requests from one or more client computing devices 116 and/or one or more software modules, among other activities. Huddle management system 106 may generate user interface 114 which may display the content in a huddle to one or more users in the form of one or more sub-applications. Internal database 104 may store any suitable data generated from the operation of one or more software modules within huddle management system 106 and may make it available for further analysis performed by one or more software modules within huddle management system 106, and/or one or more users.

Figure 2:
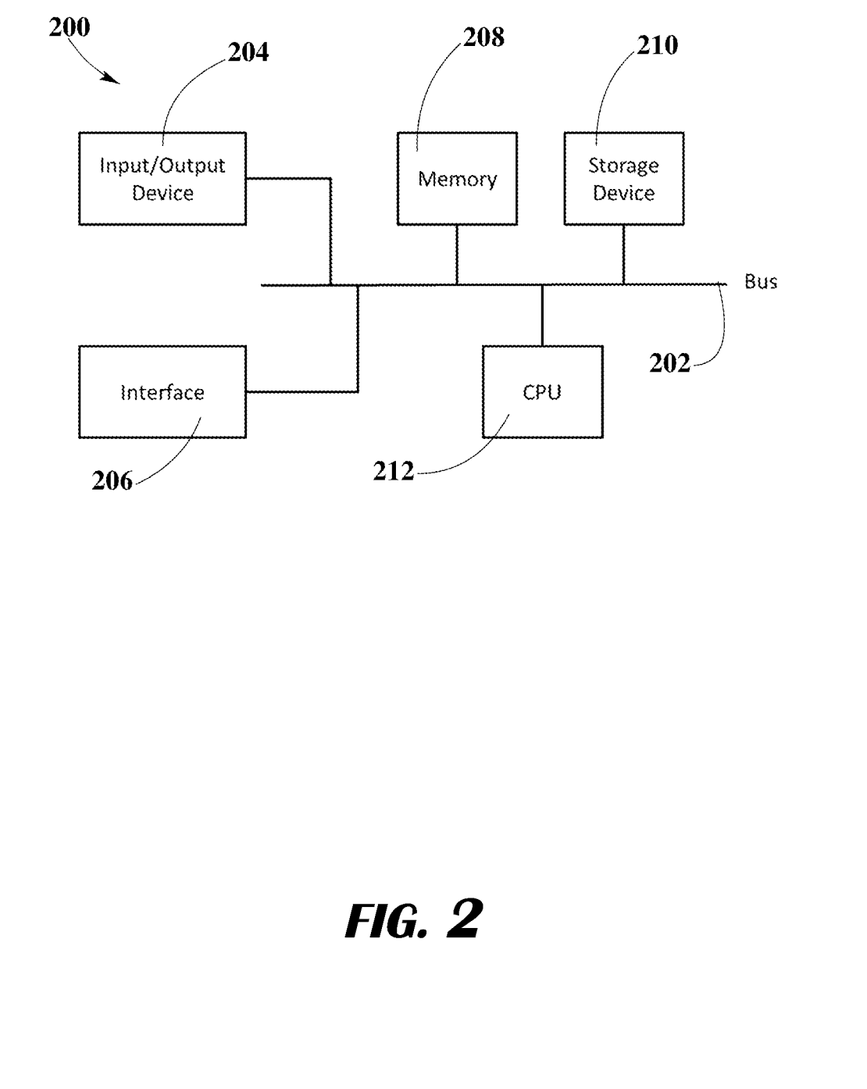
FIG. 2 is an exemplary computing system in which one or more embodiments of the present disclosure may operate.

FIG. 2 is a block diagram of example components in a computing device 200, in which one or more embodiments of the present disclosure may operate.

According to some aspects of this embodiment computing device 200 may correspond to a server, a client computing device, a smartphone, a desktop computer, a laptop computer, a tablet, a PDA, and/or another type of processor-controlled device that may receive, process, and/or transmit digital data, among others. Computing device 200 may include a bus 202, an input/output device 204, an interface 206, a memory 208, a storage device 210, and a central processing unit (CPU) 212. In another embodiment, computing device 200 may include additional, fewer, different, and/or differently arranged components than are illustrated in FIG. 2.

Bus 202 may include a path which may allow components within computing device 200 to communicate with each other. Input/output device 204 may include peripherals and/or other mechanisms that may enable a user to input information to computing device 200, including for example a keyboard, a mouse, a button, a touch screen, voice recognition, and biometric mechanisms, among others. Input/output device 204 may also include a mechanism that may output information to the user of computing device 200 such as, for example, a display, a light emitting diode (LED), and a speaker, among others. Interface 206 may include mechanisms that may enable computing device 200 to communicate with other computing devices 200 and/or systems through network connections. Network connections may refer to any suitable connections between computers such as, for example, intranets, local area networks (LAN), virtual private networks (VPN), wireless area networks (WAN) and the internet among others. Memory 208 may include a random access memory (RAM) or another type of dynamic storage device 210 which may store information and instructions for execution by central processing unit (CPU) 212. Storage device 210 may include a magnetic and/or optical recording medium such as read-only memory, flash memory, ferroelectric RAM (F-RAM) hard disks, floppy disks, and optical discs, among others. Central processing unit (CPU) 212 may include a microprocessor, an application specific integrated circuit (ASIC), or field programmable object array (FPOA), among others, which may interpret and execute instructions.

According to some embodiments of the present disclosure, at least one computing device 200 may perform certain operations to conduct huddles digitally required for the proper operation of a huddle collaboration system. Computing devices 200 may perform these operations in response to central processing unit (CPU) 212 executing software instructions that may be contained in a computer-readable medium, such as memory 208.

The software instructions may be read into memory 208 from another computer-readable medium, such as storage device 210, or from another computing device 200 via interface 206. The software instructions contained in memory 208 may cause central processing unit (CPU) 212 to perform one or more suitable processes which may be further described later. Alternatively, hardwired circuitry may be used in place of or in combination with software instructions to implement processes described herein. Thus, implementations described herein are not limited to any specific combination of hardware circuitry and software.

Figure 3:
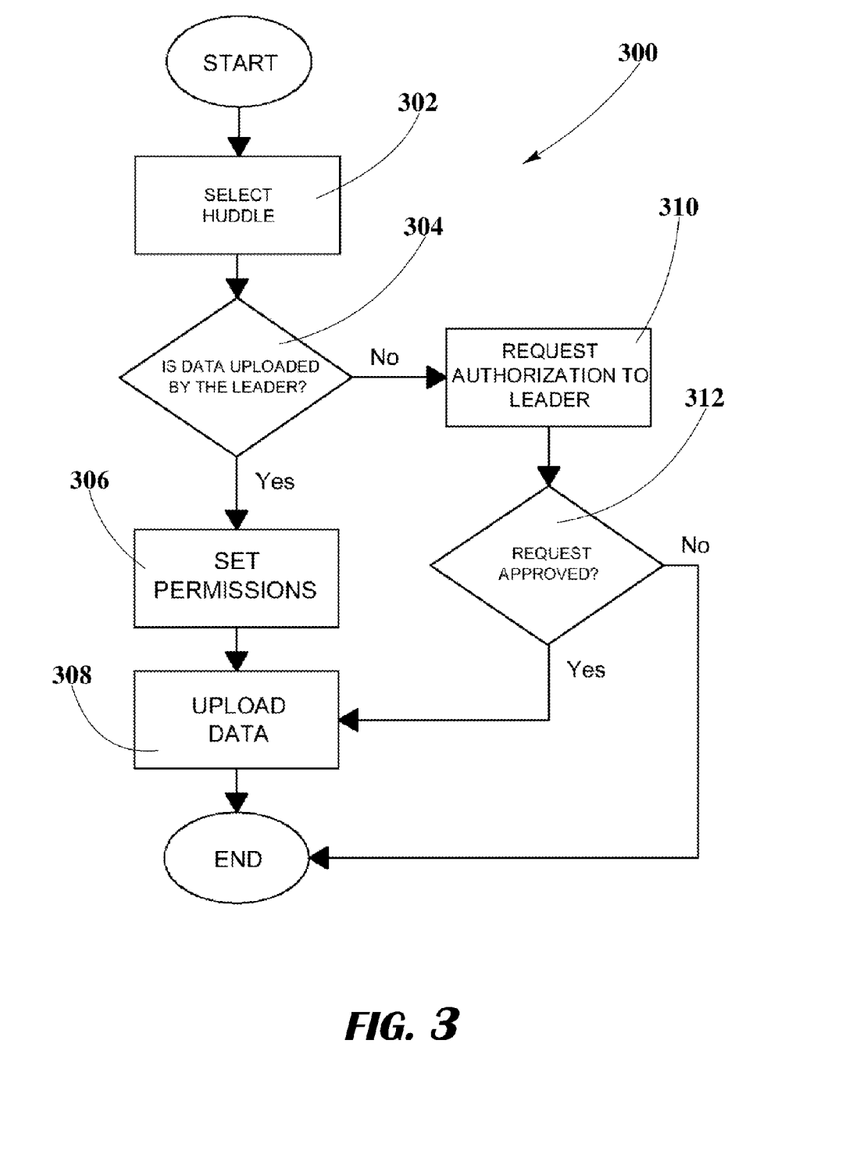
FIG. 3 is a flowchart of a method for uploading data to be used in a huddle collaboration system, according to another embodiment.

FIG. 3 depicts a flowchart describing a method for uploading data 300 which may be used during huddle sessions established in a remote huddle collaboration system. The method may be employed by one or more data processing modules, which may be executed by one or more module managers. Data processing modules may include one or more software modules including one or more algorithms and/or one or more set of instructions. Method for uploading data 300 may run in one or more computing devices, including tablets, smartphones, laptop computers, desktop computers and the like.

Method for uploading data 300 may start when a software module and/or application installed on a computing device allows one or more users to select a huddle from a user interface at step 302. User interface may be supported by huddle management system, which subsequently may allow user to select the huddle. Huddle selection may be required for executing a set of instructions oriented for addressing data uploading in relation to the selected huddle, where such set of instructions may be executed by module manager. The selected huddle may be in an active or non-active session. Active session may be running while a huddle is executed and one or more users are interacting within.

Subsequently, at step 304, module manager may allow data uploading for specific users, including the team leader and authorized users by the team leader. If the data is uploaded by the team leader, then at step 306, module manager may allow team leader to set permissions through a user interface. Such permissions may include data access restrictions for specific users, time for accessing data, sharing and downloading features, among others. Team leader may configure permissions according to each user profile. Module manager may store rules and permissions in an internal database in any suitable format for instructions. Rules and permissions may be indexed to the related data.

Subsequently, at step 308, module manager may execute one or more data processing modules for starting data uploading. During step 308, user may select the amount and type of data to be uploaded through a user interface. Selected data may include text files, video, sound and graphic files. Data processing module may upload data to one or more internal databases through one or more network connections. Furthermore, at step 308, data processing module may automatically index data in one or more internal databases according to the selected huddle. Indexing may include a plurality of methods for relating data with one or more huddles, where such methods may include the use of labels, keywords, tags and meta-tags and/or the storage of data in a dedicated directory for the selected huddle. In addition, data may be sub-indexed by goals and teams included in the selected huddle. This may allow a better distribution and synchronization of the data requested for the huddle.

As an additional feature, data processing module may be automatically executed when a huddle needs to be recorded. Data processing module may automatically index and store audio and video files in an internal database along with the rest of the uploaded data related to the huddle.

Data processing modules may store data in internal databases, which may include one or more computing devices working as servers. Internal database may grant access to data when needed, and may be implemented through known in the art database management systems (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data.

After storing data in one or more internal databases, the method for uploading data 300 during huddles may end. Stored data may be available for subsequent use in another huddle and/or for sharing it with other users.

According to another embodiment, when a user is not a team leader in step 304, then module manager may allow user to request authorization for uploading data. Authorization may be asked to team leader of the huddle at step 310. If request is denied at step 312, then method for uploading data 300 may end. However, when request is approved by the team leader, module manager may allow user to upload data at step 308.

After storing data in one or more internal databases, the method for uploading data 300 during huddles may end. Stored data may be available for subsequent use in another huddle and/or for sharing it with other users.

Figure 4:
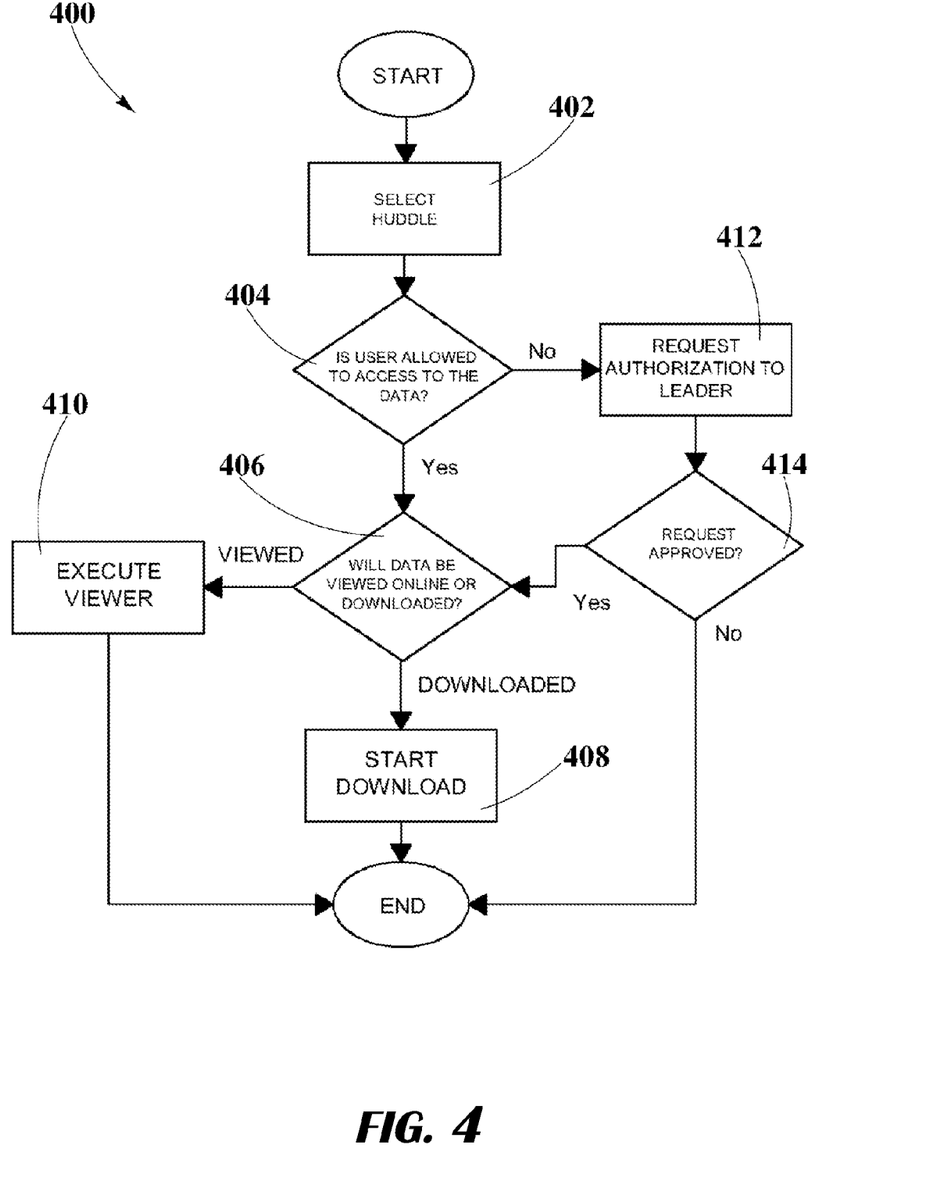
FIG. 4 is a flowchart of a method for downloading data to be used in a huddle collaboration system, according to another embodiment.

FIG. 4 depicts a flowchart describing a method for downloading data 400, which may be used during huddle sessions. The method may be employed by one or more data processing modules executed by one or more module managers, which may be one or more software modules including one or more algorithms and/or one or more set of instructions. Method for downloading data 400 may be executed in one or more computing devices, including tablets, smartphones, laptop computers, desktop computers and the like.

Method for downloading data 400 may start when a software module and/or application installed on a computing device allows one or more users to select a huddle from a user interface at step 402. User interface may be supported by huddle collaboration system, which subsequently may allow user to select the huddle. Huddle selection may be required for synchronizing data stored in internal databases to the selected huddle, where such synchronization may be executed by module manager. Because data may be previously indexed by data processing module in relation to a specific huddle, then, module manager may establish a synchronized link to data directories related to the selected huddle. This may allow a quick data access when required by the user. Furthermore, data directories may allow users to see changes of huddles over the time. This may include, old data uploaded and deleted, such as images, videos, drafts, voice recorded sessions, and the like. In addition, one or more network connections may support synchronized link. The selected huddle may be in an active or non-active session.

Subsequently, at step 404, module manager may allow data to be accessed by specific users, including the team leader and users authorized by the team leader. If the data is uploaded by an authorized user, then at step 406, data processing module may ask the method for accessing the data, which may be downloaded or viewed online. When data is selected to be downloaded, then at step 408, data processing module may start data download from one or more internal databases through one or more network connections. Subsequently, method for downloading data 400 may end.

However, if data is viewed online, then module manager may execute a viewer application at step 410, such viewer application may be a one or more software modules which may enable reading and execution of data. Viewer application may be supported as a sub-application by huddle collaboration system. Data may be provided to the viewer application from one or more internal databases by the data processing module which may access internal databases through one or more network connections. An example of a viewer application is a text reader, which is a software module that may read different text formats. Subsequently, method for downloading data 400 may end.

According to another embodiment, if a user is not authorized for accessing data in step 404, then module manager may allow user to request authorization for accessing data. Authorization may be provided by the team leader of the huddle at step 412. If request is denied at step 414, then method for downloading data 400 may end. However, if request is approved by the team leader at step 414, then module manager may allow user to select the method for accessing the data step 406. After downloading data at step 408 or executing a viewer application at step 410, method for downloading data 400 may end.

Figure 5:
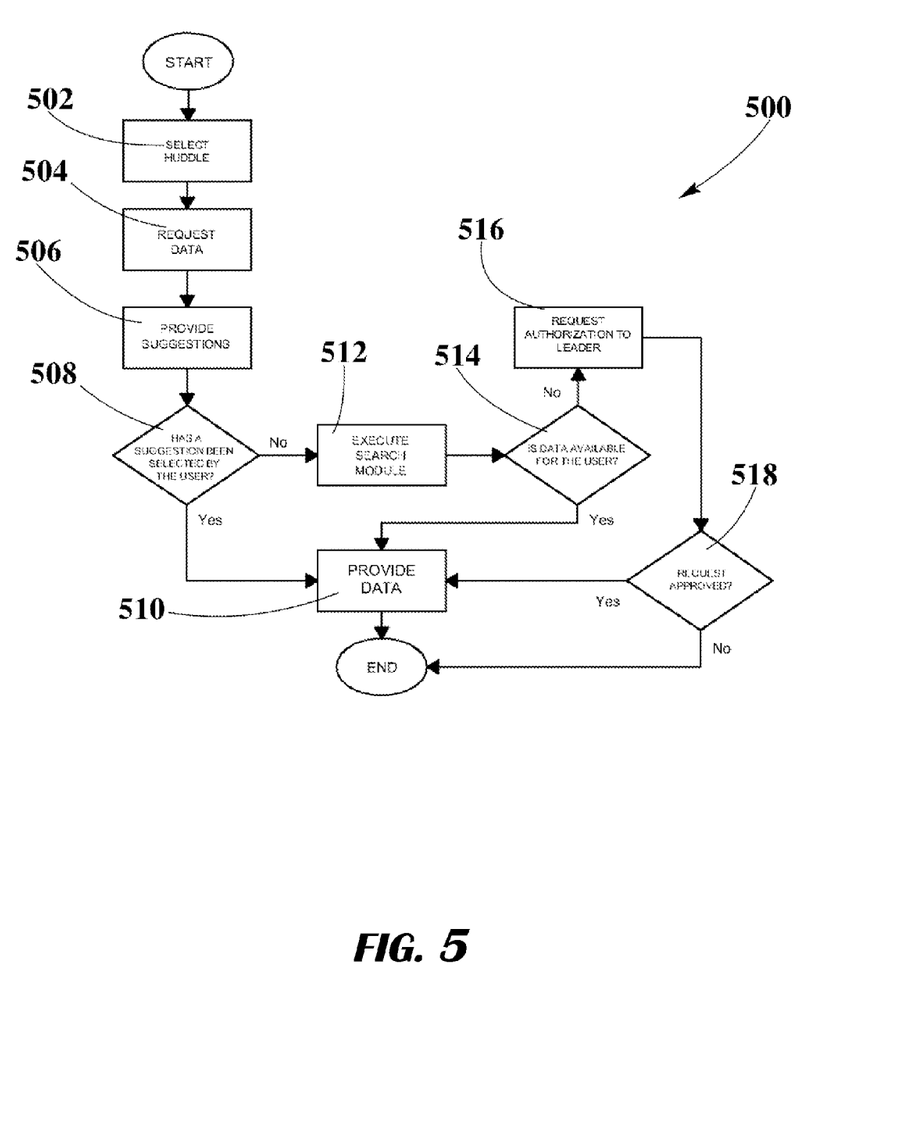
FIG. 5 is a flowchart of a method for searching data to be used in a huddle collaboration system, according to another embodiment.

FIG. 5 depicts a flowchart describing a method for searching data 500, which may be used during huddle sessions. The method may be employed by one or more data processing modules executed by one or more module managers, which may be one or more software modules including one or more algorithms and/or one or more set of instructions. Method for searching data 500 may be executed in one or more computing devices, including tablets, smartphones, laptop computers, desktop computers and the like.

Method for searching data 500 may start when a software module and/or application installed on a computing device allows one or more users to select a huddle from a user interface at step 502. User interface may be supported by huddle management system, which subsequently may allow module manager to execute one or more data processing modules for enabling a search engine. The selected huddle may be in an active or non-active session.

Subsequently, at step 504, the search engine may allow user to search for data in one or more internal databases. Search engine may include a text box for allowing users to type keywords related to the desired data. In addition, at step 506, early typed words/letters may allow data processing module to provide search suggestions to the user. Search suggestions may be created by using data mining and search trends. Data mining may be performed by data processing module which may execute one or more set of instructions dedicated for only data mining. In addition, search suggestions may include only those available for the user. If user selects the search suggestion at step 508, then at step 510 data processing module may provide requested data by accessing one or more internal databases, and the method for searching data 500 may end. However, if the user does not select the search suggestion, then at step 512, data processing module may execute one or more search modules for finding the requested data in one or more internal databases. Search modules may be one or more software modules managed by data processing module. Search modules may find data by reading the indexed data in internal databases and/or by using meta-tag search.

After the requested data is found, at step 514, data processing module may verify if requested data is available for the user. If data is available for the user, then data processing module may provide requested data at step 510 and the method for searching data 500 may end. However, if data is not available for the user, then at step 516, data processing module may communicate data status (available or not available) to module manager, which may allow user to request data access from the team leader. If data access is not granted, then the method for searching data 500 may end. However, If data access is granted by the team leader at step 518, then data processing module may provide requested data at step 510, and the method for searching data 500 may end.

Figure 6:
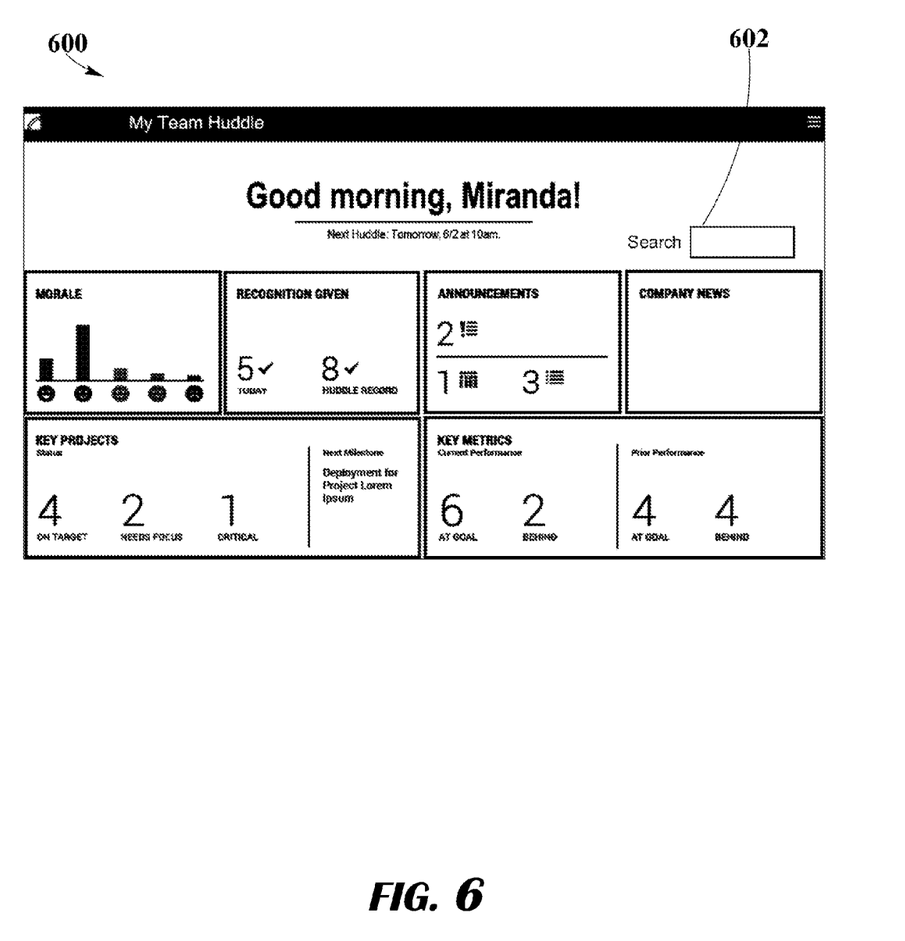
FIG. 6 is an exemplary user interface of a user's huddle summary including a search-box.

FIG. 6 depicts an exemplary user interface of a user's huddle summary 600 including a search-box 602. Search-box 602 allow user to type keywords for searching related to huddles. Search of data may employ data mining techniques, as described herein.

Example #1 refers to an exemplary use and location of one or more search-boxes 602 in a user's huddle summary 600, as depicted in FIG. 6. Search-box 602 may be located in user's huddle summary 600 for allowing a quick search for data related to huddles. Search-box 602 may allow user to type keywords, which may be employed by one or more data processing modules for providing search suggestions based on data mining techniques. Furthermore, one or more data processing modules may employ keywords for tracking data related to huddles in one or more databases.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:
   receiving, by a computer, a selection of a huddle record from a user device, the huddle record stored in a database storing one or more huddle records comprising data describing a huddle board display page and user access rights to the data of the huddle record;
   upon authenticating the user device based upon the user access rights and a set of user credentials:
      presenting, by the computer for display on the user device, a huddle board user interface having content executed by at least two sub-applications, wherein the huddle board user interface is associated with the selected huddle record;
      simultaneously presenting, by the computer on a second user device located remotely from the user device, a synchronized version of the huddle board user interface;
      receiving, by the computer, a new data from the user device through a network connection coupling the computer with the user device;
      receiving, by the computer, from the user device a plurality of selections indicating one or more characteristics of the new data;
      generating, by the computer, a plurality of tags for the new data based upon the selection of the huddle record and the plurality of selections received from the user device, wherein a first tag is metadata that associates the new data with the huddle record, and wherein each respective tag of the plurality of tags is metadata indicating a respective characteristic of the new data;
      storing, by the computer, the new data in the database, wherein the new data is associated with one or more huddle records in accordance with one or more tags associating the new data with the one or more huddle records;
      presenting, by the computer for display on the user device, an updated huddle board user interface having content comprising the new data; and
      simultaneously presenting, by the computer on the second user device located remotely from the user device, a synchronized version of the updated huddle board user interface;
   upon the computer receiving, from the user device, a query inputted in the huddle board user interface for data related to the selected huddle board, wherein the query contains one or more parameters identifying data related to the selected huddle board including a keyword and one or more characteristics:
      identifying, by the computer, in a second database a machine-readable computer file containing data matching the keyword parameter of the query;
      identifying, by the computer, in the second database a machine-readable computer file having a metadata tag indicating the computer file matches the one or more characteristics;
      identifying, by the computer, each other huddle record containing data associated with the tag indicating the data has a characteristic matching the keyword parameter of the query;
      identifying, by the computer, each other huddle record based upon the first tag the data in the record of the huddle board in the database of huddle records;
      presenting, by the computer for display on the user device, a composite huddle board display page with a set of query results based on the one or more parameters of the query, the set of query results displaying other huddle records having data related to the selected huddle board and the one or more machine-readable computer files having data related to the selected huddle board; and simultaneously presenting, by the computer on a second user device located remotely from the user device, a synchronized version of the composite huddle board user interface.

2. A computer-implemented method comprising:

receiving, by a computer, a selection of a huddle record from a user device, the huddle record stored in a database storing one or more huddle records comprising data describing a huddle board display page and user access rights to the data of the huddle record;

upon authenticating the user device based upon the user access rights and a set of user credentials:

presenting, by the computer for display on the user device, a huddle board user interface having content executed by at least two sub-applications, wherein the huddle board user interface is associated with the selected huddle record;

simultaneously presenting, by the computer on a second user device located remotely from the user device, a synchronized version of the huddle board user interface;

receiving, by the computer, a new data from the user device through a network connection coupling the computer with the user device;

receiving, by the computer, from the user device a plurality of selections indicating one or more characteristics of the new data;

generating, by the computer, a plurality of tags for the new data based upon the selection of the huddle record and the plurality of selections received from the user device, wherein a first tag is metadata that associates the new data with the huddle record, and wherein each respective tag of the plurality of tags is metadata indicating a respective characteristic of the new data;

storing, by the computer, the new data in the database, wherein the new data is associated with one or more huddle records in accordance with one or more tags associating the new data with the one or more huddle records;

presenting, by the computer for display on the user device, an updated huddle board user interface having content comprising the new data; and simultaneously presenting, by the computer on the second user device located remotely from the user device, a synchronized version of the updated huddle board user interface.

3. A computer-implemented method comprising:

receiving, by a computer, a selection of a huddle record from a user device, the huddle record stored in a database storing one or more huddle records comprising data describing a huddle board display page and user access rights to the data of the huddle record;

upon authenticating the user device based upon the user access rights and a set of user credentials:

presenting, by the computer for display on the user device, a huddle board user interface having content executed by at least two sub-applications, wherein the huddle board user interface is associated with the selected huddle record;

simultaneously presenting, by the computer on a second user device located remotely from the user device, a synchronized version of the huddle board user interface;

upon the computer receiving, from the user device, a query inputted in the huddle board user interface for data related to the selected huddle board, wherein the query contains one or more parameters identifying data related to the selected huddle board including a keyword and one or more characteristics:

identifying, by the computer, in a second database a machine-readable computer file containing data matching the keyword parameter of the query;

identifying, by the computer, in the second database a machine-readable computer file having a metadata tag indicating the computer file matches the one or more characteristics;

identifying, by the computer, each other huddle record containing data associated with the tag indicating the data has a characteristic matching the keyword parameter of the query;

identifying, by the computer, each other huddle record based upon the first tag the data in the record of the huddle board in the database of huddle records;

presenting, by the computer for display on the user device, a composite huddle board display page with a set of query results based on the one or more parameters of the query, the set of query results displaying other huddle records having data related to the selected huddle board record and the one or more machine-readable computer files having data related to the selected huddle board record; and simultaneously presenting, by the computer on a second user device located remotely from the user device, a synchronized version of the composite huddle board user interface.

* * * * *